(12) United States Patent
Tiede et al.

(10) Patent No.: US 6,247,263 B1
(45) Date of Patent: Jun. 19, 2001

(54) UNIVERSAL BOBBER

(76) Inventors: David G. Tiede, 88 Willowdale St., Sault Ste. Marie, Ontario (CA), P6A524; Daniel G. Tiede, 1500 Caille, Box 70, Bill River Ontario (CA), NOR1AO; Paul E. Tiede, 1048 Windemere, Windsor Ontario (CA), NHY3E4

( * ) Notice: Subject to any disclaimer, the term of this patent is extended or adjusted under 35 U.S.C. 154(b) by 0 days.

(21) Appl. No.: 09/491,872

(22) Filed: Jan. 27, 2000

Related U.S. Application Data

(60) Provisional application No. 60/123,077, filed on Mar. 4, 1999.

(51) Int. Cl.⁷ ................................................. A01K 93/00
(52) U.S. Cl. ........................ 43/44.88; 43/44.87; 43/44.92
(58) Field of Search ......................... 43/44.87, 44.88, 43/44.89, 44.91, 44.92, 44.95

(56) References Cited

U.S. PATENT DOCUMENTS

| | | | |
|---|---|---|---|
| 83,681 | 11/1868 | Albee | 43/44.81 |
| 148,926 | 3/1874 | Cahoon | 43/44.81 |
| 1,193,684 * | 8/1916 | Gregory et al. | 43/44.92 |
| 1,232,390 * | 7/1917 | Phillips | 43/44.88 |
| 2,181,458 * | 11/1939 | La Gue | 43/44.87 |
| 2,374,752 * | 5/1945 | Johnson | 43/44.95 |
| 2,493,971 * | 1/1950 | Johnson | 43/44.91 |
| 2,500,078 * | 3/1950 | Ingram | 43/44.91 |
| 2,564,426 * | 8/1951 | Curtiss | 43/44.88 |
| 2,597,737 * | 5/1952 | Kay et al. | 43/44.88 |
| 2,598,011 | 5/1952 | Pitre | 43/44.8 |
| 2,712,194 * | 7/1955 | Di Stefano | 43/44.91 |
| 2,763,088 | 9/1956 | Cowsert | 43/43.14 |
| 2,775,842 | 1/1957 | McCode | 43/44.81 |
| 2,842,886 * | 7/1958 | Williams | 43/44.87 |
| 2,937,469 * | 5/1960 | Tiede | 43/44.88 |
| 3,154,878 * | 11/1964 | Ekstrand | 43/44.88 |
| 3,303,598 * | 2/1967 | Spindler | 43/44.87 |
| 3,747,257 | 7/1973 | Olsen | 43/43.14 |
| 3,750,324 * | 8/1973 | Verheij | 43/44.88 |
| 3,827,175 * | 8/1974 | Howard | 43/44.95 |
| 4,199,889 * | 4/1980 | Van Orden et al. | 43/44.88 |
| 4,406,081 * | 9/1983 | Garner | 43/44.95 |
| 4,574,515 * | 3/1986 | Garner | 43/44.95 |
| 5,608,985 * | 3/1997 | Kainec | 43/44.87 |

FOREIGN PATENT DOCUMENTS

| | | | |
|---|---|---|---|
| 617933 * | 4/1961 | (CA) | 43/44.88 |
| 3438542 * | 4/1986 | (DE) . | |
| 3611272 * | 5/1987 | (DE) . | |
| 908877 * | 4/1946 | (FR) | 43/44.92 |
| 2220188 * | 11/1974 | (FR) . | |
| 1192413 * | 5/1970 | (GB) . | |
| 2280830 * | 2/1995 | (GB) . | |

* cited by examiner

*Primary Examiner*—Darren W. Ark
(74) *Attorney, Agent, or Firm*—Shlesinger, Arkwright & Garvey LLP

(57) ABSTRACT

A fishing bobber which has a threaded rod positioned internally of the bobber, and which has a weight at one end. The weight can be adjusted along the threaded rod to alter the disposition of the bobber in the water.

34 Claims, 2 Drawing Sheets

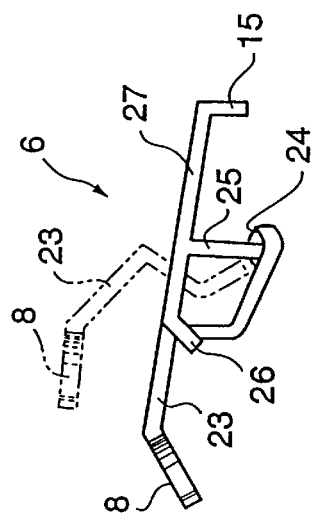
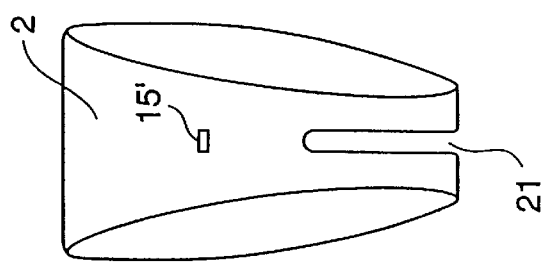
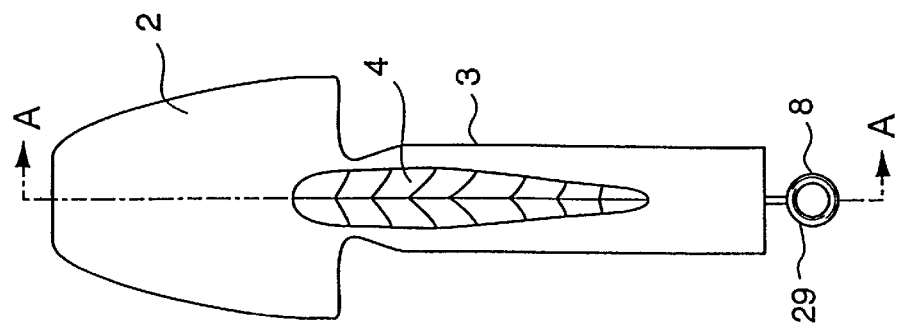

UNIVERSAL BOBBER

This is a conversion of Provisional Ser. No. 60/123,077, filed Mar. 4, 1999.

BACKGROUND OF THE INVENTION

This invention relates, in general, to fishing bobbers, and, in particular, to a fishing bobber that is adjustable to assume different aspects and functions when in the water, thus allowing for more variety in bait presentations.

DESCRIPTION OF THE PRIOR ART

In the prior art various types of fishing bobbers have been proposed. For example, U.S. Pat. No. 83,681 to Albee discloses a fishing sinker which has a two part body connected by a threaded rod. The parts can be separated or one part can be replaced by turning them in opposite directions along the threaded rod.

U.S. Pat. No. 148,926 to Cahoon discloses a fishing hook which has a hollow threaded rod which is used to secure a hook within the bobber body.

U.S. Pat. No. 2,598,011 to Pitre discloses a lure having a weight attached to the lure by means of a threaded rod which can be used to adjust the position of the weight.

U.S. Pat. No. 2,775,842 to McCode discloses a fish hook with a weight whose position can be adjusted by means of a set screw which engages a linear portion of the hook.

SUMMARY OF THE INVENTION

The present invention is directed to a fishing bobber which has a threaded rod positioned internally of the bobber, and which has a weight at one end. The weight can be adjusted along the threaded rod to alter the disposition of the bobber in the water.

It is an object of the present invention to provide a new and improved fishing bobber.

It is an object of the present invention to provide a new and improved fishing bobber which has more variety in effective bait presentation.

It is an object of the present invention to provide a new and improved fishing bobber which is compact and can easily snap on and off the fishing line, without the need for tying or untying the fishing line.

These and other objects and advantages of the present invention will be fully apparent from the following description, when taken in connection with the annexed drawings.

BRIEF DESCRIPTION OF THE DRAWINGS

FIG. 3 is a view of the back of the present invention.

FIG. 4 is a view of the top of the present invention.

FIG. 5 is a view of the locking device of the present invention showing the device in the closed and open position.

DESCRIPTION OF THE PREFERRED EMBODIMENT

Figure 1:
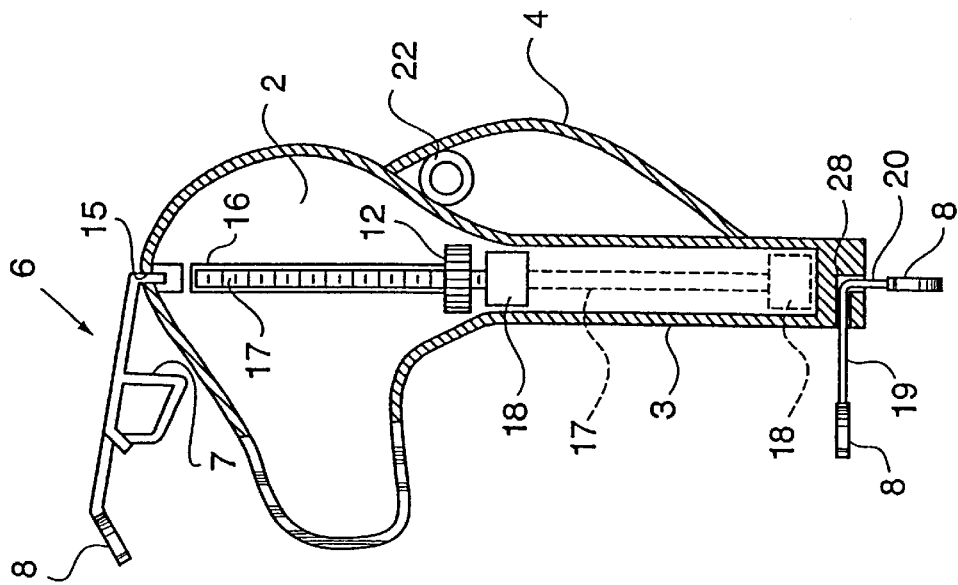
FIG. 1 is a side view of the present invention.

Referring now to the drawings in greater detail, FIG. 1 shows the bobber 1 of the present invention. The bobber 1 is composed of a head portion 2, a neck portion 3, and a rear fin portion 4. The head portion can have decorative markings such as an eye 5 affixed thereto in any conventional manner. It should be noted that the specific shape, i.e. the head portion 2, neck portion 3, and rear fin portion 4, and the markings 5 can be changed without departing from the scope of the invention.

The top portion of the head 2 has a slot 15' (see FIG. 4) which will accept a straight portion 15 (see FIG. 2) of the line holder 6 in order to secure the line holder to the head portion. The front of the head portion 2 has a slot 21 (see FIGS. 1 and 4) which will allow the fishing line 10 to pass through this portion of the head 2.

As shown in FIG. 1, the fishing line 10 will lead from the fishing pole (not shown) to the bottom of the neck portion 3. At this point it will pass through an eyelet 8 and then continue around to the front side of the neck 3 where it will pass through a second eyelet 8. The line 10 will continue up the front of the neck portion 3, pass through slot 21, and then be "pinched" by holder 6. From there, the line will pass through another eyelet 8 and descend down in front of the head portion 2 where an attachment 13 is secured to the line in any conventional manner. The attachment 13 will have a fish hook 14 attached thereto, again, in any conventional manner.

Figure 2:
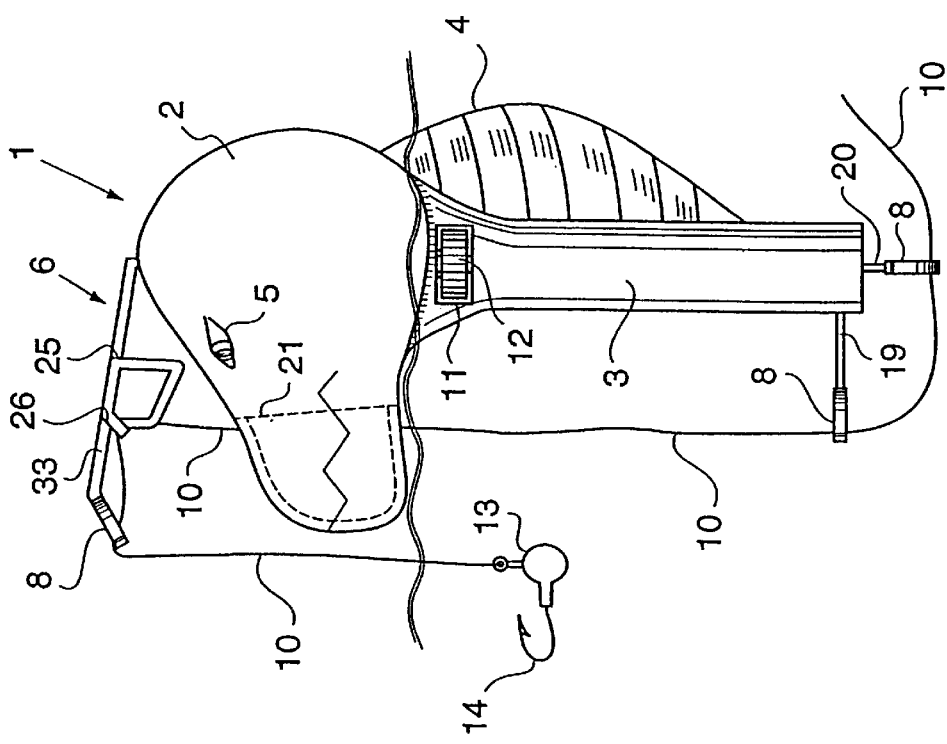
FIG. 2 is a cross-sectional view of the present invention.

As shown in FIG. 2, the bobber is made in halves in order to place the threaded rod, 17, the adjusting wheel 12 and the weight 18 inside. The bobber is shown as being hollow, however, the halves could be made as solid parts with just the slot 16 to allow the threaded rod, 17, the adjusting wheel 12 and the weight 18 to fit inside the bobber. The halves of the bobber are preferably made from plastic by an injection molding process and then secured together in any conventional manner. However, it should be understood that other materials and other methods of manufacture can be used without departing from the scope of the invention.

Secured within a slot 16 on the interior of the bobber, is a threaded rod 17, with an adjusting wheel 12 threaded thereto. The adjusting wheel 12 projects through a slot 11 in the neck portion of the bobber 1, as shown in FIG. 1. This will allow the weight 18 to be moved easily by the adjusting wheel 12 from the outside of the bobber. As shown in FIG. 2, the weight can be moved from the solid line position to the dotted line position merely by rotating the wheel 12. Secured to the fin portion 4 is another weight 22 which will help to maintain the balance of the bobber when it is in use.

Since the wheel 12 projects through the slot 11, the position of the wheel is fixed vertically with respect to the bobber. However, the threaded rod is not fixed to the bobber except by its threaded connection with the wheel 12. Therefore, when the wheel is turned, the threaded rod (and the weight 18 secured thereto) will move from the position shown in solid lines in FIG. 2, to the position shown by the dotted lines. This shifting of the weight will change the center of gravity of the bobber and will cause the bobber to ride in more of a horizontal position in the water when the weight is in an upper position with respect to the body of the bobber. Shifting the weight to a lower position, with respect to the body of the bobber, will cause the bobber to assume a more perpendicular position in the water.

Therefore, the position of the weight will determine the position of the bobber in the water, which in turn will determine the position of the hook 14. If the weight is in an upper position, with respect to the body of the bobber, the hook will tend to sink toward the bottom of the water. If the weight is in a lower position, with respect to the body of the bobber, the hook will tend to rise toward the top of the water. This adjustable weight feature, along with the holding clip 6, will allow the user to position the hook 14 at virtually any position between a position adjacent the surface of the water to a position on the bottom of the body of water that is being fished.

As shown in FIG. 5, the line holding means 6 can be moved from an open position, shown by the dotted lines, to a closed position, shown by the solid lines. The movable arm 23 of the holding means is pivoted at 24 to the fixed arm 25. This allows the pivoted arm 23 to be pivoted from the position shown in solid lines to the position shown in dotted lines. In order to hold the fishing line 10, the holding means will be moved into the dotted line position, and the line will be placed adjacent the inside portion of 26, then the arm 23 will be moved to the solid line position, and the line 10 will be pinched between the portion 26 and the portion 23. This will allow the user to position the hook 14 at any position with respect to the bobber 1 by "pinching" the line 10 in the holding means 6, as explained above.

As can be seen in FIGS. 1 and 2, the fishing line 10 is passed through the two eyelets 8 at the bottom of the neck portion 3. Each of the eyelets 8 are attached to an arm 19 and 20, which are held in a slot 28 at the bottom of the neck portion. These eyelets will allow the line to "turn the corner" around the bottom of the bobber without any binding or resistance applied to the line. These eyelets also control the attitude of the bobber by the user pulling or flicking back with the fishing pole.

Thus, in use a fisherman would decide what position he/she wants the hook to be in with respect to the bobber. The line 10 would be passed through the eyelets 8 on the arms 19, 20, then passed through the slot 21 and would be "pinched" in the holding means 6 to secure the hook 14 in the proper position. Then the user would decide what position the bobber is to assume in the water, and adjust the weight 18 up or down within the bobber 1 (through the use of the wheel 12).

When a fish strikes the hook 14, the force of the fish taking the hook would pull line 10 causing the bobber to tip forward allowing arm 23 to pivot up which releases line 10 from being pinched between 26 and 23 and allowing line 10 to run free through all the eyelets and 26. This would insure that unnecessary resistance on the line is avoided, as the line will pass freely through the bobbers. It should be noted that the eyelets 8 could be slotted as shown at 29 in FIG. 3 in order to allow fishing line of different strengths to snap into the eyelets.

Although the Universal Bobber and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A fishing bobber, comprising:
   a) a body floatable in water, said body including a front portion;
   b) a weight carried by said body, said weight being movable between first and second positions to control positioning of said body in water;
   c) a holder carried by said body to hold a fishing line, said holder providing an amount of holding force on the fishing line that varies depending on the position of said weight when the line is engaged with said holder, said holder providing more holding force when said weight is in said first position than when said weight is in said second position; and
   d) said holder comprising a fixed arm carried by said body and a pivotable arm.

2. A fishing bobber as in claim 1, wherein said weight in said first position provides said body a first center of gravity.

3. A fishing bobber as in claim 1, wherein said weight in said second position provides said body a second center of gravity.

4. A fishing bobber as in claim 1, wherein said pivotable arm is carried by said fixed arm.

5. A fishing bobber as in claim 4, wherein said fixed arm includes a portion on which the fishing line is to be supported.

6. A fishing bobber as in claim 5, wherein said pivotable arm pressing against said fixed arm portion provides the holding force on the fishing line when the line is engaged with said holder.

7. A fishing bobber as in claim 6, wherein said weight in said second position provides said pivotable arm with less holding force being applied on the fishing line than when said weight is in said first position when the line is engaged with said holder.

8. A fishing bobber as in claim 6, wherein said pivotable arm is adapted to release the fishing line when said body is tilted forward.

9. A fishing bobber as in claim 8, wherein:
   a) said body assumes an upright position when said weight is in said first position; and
   b) said body is tilted forward when said weight is in said second position.

10. A fishing bobber as in claim 1, and further comprising:
    a) a threaded rod secured to said weight and carried by said body; and
    d) an adjusting wheel threadedly secured to said rod and operably secured to said body such that turning said wheel is effective to move said weight between said first and second positions.

11. A fishing bobber as in claim 10, wherein:
    a) said body includes an opening; and
    b) said wheel projects through said opening.

12. A fishing bobber, comprising:
    a) a body having a top and a bottom;
    b) said body having first means for holding a fishing line adjacent said top;
    c) said body having second means for holding the fishing line adjacent said bottom;
    d) said body having an adjusting means for controlling positioning of said body in water; and
    e) said adjusting means comprising a threaded rod held within said body, a weight secured to said threaded rod, and means on said rod and said body for moving said threaded rod upwards and downwards with respect to said body.

13. A fishing bobber, comprising:
    a) a body floatable in water, said body including top, bottom and front portions:
    b) a first eyelet from which a fishing line depends to a hook when the line having the hook is threaded therethrough, said first eyelet being disposed at said top portion and toward said front portion, said first eyelet being pivotable when said body is tilted forward;
    c) a holder associated with said first eyelet, said holder for holding the fishing line threaded through said first eyelet, said holder being adapted to release the fishing line when said first eyelet is pivoted when said body is tilted forward;

d) a second eyelet disposed at said bottom portion to guide the fishing line to said holder along one direction and to a user in an opposite direction;

e) a weight carried by said body, said weight being movable between a first position near said bottom portion where said body assumes a lower center of gravity and a second position away from said bottom portion and toward said top portion where said body assumes a higher center of gravity;

f) said body being easier to tilt forward by a fish or the user's pulling on the fishing line, thereby causing the holder to release the line, when said weight is in said second position than when said weight is in said first position; and g) a third eyelet disposed at said bottom portion to guide the fishing line to said second eyelet, said third eyelet extending at a different angle from said body than said second eyelet.

14. A fishing bobber as in claim 13, wherein:
a) said holder includes a fixed member secured to said top portion;
b) said fixed member includes a portion on which the fishing line is to be supported; and
c) said first eyelet is pivotable toward and away from said fixed member portion.

15. A fishing bobber as in claim 14, wherein said fixed member portion is disposed rearwardly of said first eyelet.

16. A fishing bobber as in claim 14, wherein said second eyelet is disposed below said fixed member portion and forwardly of said third eyelet.

17. A fishing bobber as in claim 14, wherein said top portion includes an opening through which a portion of the fishing line passes through between said fixed member portion and said second eyelet when the line is threaded through said first eyelet.

18. A fishing bobber as in claim 14, wherein said first eyelet includes a shaft portion engageable with said fixed member portion.

19. A fishing bobber as in claim 14, wherein said first and second eyelets and said fixed member portion are configured such that the fishing line changes direction at said first and second eyelets and said fixed member portion when the line is engaged therewith.

20. A fishing bobber as in claim 14, wherein said first, second and third eyelets and said fixed member portion are configured such that the fishing line changes direction approximately 90° at said second eyelet and said fixed member portion when the line is engaged therewith.

21. A fishing bobber as in claim 13, wherein said second eyelet is positioned approximately 90° with respect to said third eyelet.

22. A fishing bobber as in claim 13, wherein said first eyelet is disposed forwardly of said body.

23. A fishing bobber, comprising:
a) a body floatable in water, said body including top and bottom portions;
b) a weight carried by said body, said weight being movable between first and second positions to control positioning of said body in water;
c) a threaded rod secured to said weight and carried by said body, said rod having upper and lower portions;
d) an adjusting wheel threadedly secured to said rod and operably secured to said body such that turning said wheel is effective to move, said weight between said first and second positions;
e) a first eyelet for threadedly receiving fishing line, said first eyelet being disposed at said top portion;
f) a second eyelet for threadedly receiving the fishing line, said second eyelet being disposed at said bottom portion; and
g) a holder to hold the fishing line.

24. A fishing bobber as in claim 23, wherein said weight is secured to said lower portion.

25. A fishing bobber as in claim 23, wherein said rod is disposed within said body.

26. A fishing bobber as in claim 23, wherein:
a) said body includes an opening; and
b) said wheel projects through said opening.

27. A fishing bobber as in claim 23, and further comprising another weight secured to an intermediate portion of said body.

28. A fishing bobber as in claim 23, wherein:
a) said holder comprises a shaft having first and second ends; and
b) said first end is secured to said top portion and said second end includes a portion on which the fishing line is to be supported.

29. A fishing bobber as in claim 28, wherein:
a) said holder comprises a rotatable portion secured to said shaft;
b) said rotatable portion being movable between a first position where said rotatable portion is remote from said second end portion and a second position where said rotatable portion is adjacent said second end portion; and
c) said rotatable portion when in said second position being close enough to said second end portion to secure the fishing line between said rotatable portion and said second end portion.

30. A fishing bobber as in claim 29, wherein said rotatable portion includes said first eyelet.

31. A fishing bobber as in claim 28, wherein
a) said top portion of said body includes an aperture; and
b) said first end of said shaft is secured within said aperture.

32. A fishing bobber as in claim 23, and further comprising a third eyelet disposed at said bottom portion of said body.

33. A fishing bobber as in claim 32, wherein said second and third eyelets are secured to each other.

34. A fishing bobber as in claim 32, wherein said second and third eyelets are positioned approximately 90° with respect to each other.

* * * * *